US012652625B2

(12) United States Patent
Lee

(10) Patent No.: US 12,652,625 B2
(45) Date of Patent: Jun. 9, 2026

(54) ELECTRONIC DEVICE AND METHOD FOR CONTROLLING TRANSMISSION POWER BASED ON Bluetooth COMMUNICATION IN ELECTRONIC DEVICE

(71) Applicant: Samsung Electronics Co., Ltd., Suwon-si (KR)

(72) Inventor: Insik Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 308 days.

(21) Appl. No.: 18/351,168

(22) Filed: Jul. 12, 2023

(65) Prior Publication Data

US 2023/0354218 A1      Nov. 2, 2023

Related U.S. Application Data

(63) Continuation of application No. PCT/KR2021/019805, filed on Dec. 24, 2021.

(30) Foreign Application Priority Data

Jan. 13, 2021      (KR) ........................ 10-2021-0004661

(51) Int. Cl.
  *H04W 52/38*      (2009.01)
  *H04W 52/24*      (2009.01)
  *H04W 52/36*      (2009.01)
(52) U.S. Cl.
  CPC ......... *H04W 52/383* (2013.01); *H04W 52/24* (2013.01); *H04W 52/367* (2013.01)
(58) Field of Classification Search
  CPC ..... H04W 4/80; H04W 52/245; H04W 52/24; H04W 52/04; H04W 52/367; H04W 52/08; H04W 52/383
  See application file for complete search history.

(56) References Cited

U.S. PATENT DOCUMENTS 6,628,958 B1      9/2003   Kamel et al.
10,757,654 B2     8/2020   Wang et al.
              (Continued)

FOREIGN PATENT DOCUMENTS

CN       209949391 U  *  1/2020
JP       2015504263 A  *  2/2015   ............ H04W 52/38
              (Continued)

OTHER PUBLICATIONS

Bluetooth Core Specification, V5.2 XP009545985, Dec. 31, 2019 URL:https://www.bluetooth.com/specifications/specs/core-specification.
              (Continued)

*Primary Examiner* — Dung Hong
(74) *Attorney, Agent, or Firm* — Jefferson IP Law, LLP

(57)      ABSTRACT

An electronic device is provided. The electronic device includes a Bluetooth communication module, a memory, and a processor operatively connected to the Bluetooth communication circuit and the memory, wherein the processor may be configured to perform the operations of receiving, through the Bluetooth communication module, a transmission power increase request from an external electronic device during Bluetooth communication with the external electronic device, compare a transmission power level based on the received increase request with a second maximum transmission power level which is designated to be smaller than a first maximum transmission power level that can be provided by the electronic device, when the transmission power level based on the increase request is less than the second maximum transmission power level, transmit a message indicating an increase in the transmission power level to the external electronic device after the transmission power level of the Bluetooth communication circuit is increased.

17 Claims, 8 Drawing Sheets

(56) References Cited

U.S. PATENT DOCUMENTS

| | | | |
|---|---|---|---|
| 2004/0242258 A1 | 12/2004 | Kim | |
| 2006/0003700 A1* | 1/2006 | Yasuda | H04B 1/3805 |
| | | | 455/41.2 |
| 2009/0111500 A1* | 4/2009 | Sudak | H04W 52/367 |
| | | | 455/522 |
| 2010/0233975 A1 | 9/2010 | Wu et al. | |
| 2011/0281612 A1 | 11/2011 | Ishii et al. | |
| 2012/0021704 A1* | 1/2012 | Chan | H03F 1/02 |
| | | | 455/127.2 |
| 2012/0044815 A1 | 2/2012 | Geirhofer et al. | |
| 2013/0035084 A1 | 2/2013 | Song et al. | |
| 2013/0281167 A1* | 10/2013 | Cho | H04W 52/24 |
| | | | 455/571 |
| 2016/0191121 A1 | 6/2016 | Bell et al. | |
| 2016/0374028 A1* | 12/2016 | Narang | H04W 52/20 |
| 2019/0028970 A1 | 1/2019 | Wang | |
| 2019/0327684 A1* | 10/2019 | Wang | H04W 52/0274 |
| 2019/0393932 A1 | 12/2019 | Hsu et al. | |
| 2020/0053832 A1* | 2/2020 | Yang | H04W 76/15 |
| 2020/0128494 A1 | 4/2020 | Lu et al. | |
| 2021/0219240 A1 | 7/2021 | Lee et al. | |
| 2021/0250879 A1 | 8/2021 | Choi et al. | |
| 2023/0269672 A1* | 8/2023 | Wang | H04W 52/245 |
| | | | 455/522 |

FOREIGN PATENT DOCUMENTS

| | | | | | |
|---|---|---|---|---|---|
| KR | 20020013363 A | * | 2/2002 | | H04W 52/12 |
| KR | 10-2004-0103658 A | | 12/2004 | | |
| KR | 100538908 B1 | * | 12/2005 | | H04W 52/241 |
| KR | 10-0542101 B1 | | 1/2006 | | |
| KR | 10-0723106 B1 | | 5/2007 | | |
| KR | 10-2011-0081954 A | | 7/2011 | | |
| KR | 10-1484623 B1 | | 1/2015 | | |
| KR | 10-1575993 B1 | | 12/2015 | | |
| KR | 10-2020-0084158 A | | 7/2020 | | |
| WO | 2017/113293 A1 | | 7/2017 | | |
| WO | 2018/152709 A1 | | 8/2018 | | |
| WO | 2019/235892 A1 | | 12/2019 | | |
| WO | WO-2020171243 A1 | * | 8/2020 | | H04B 1/00 |

OTHER PUBLICATIONS

European Search Report dated May 29, 2024, issued in European Application No. 21919934.6.

Korean Office Action dated Feb. 6, 2025, issued in Korean Application No. 10-2021-0004661.

International Search Report dated Mar. 24, 2022, issued in International Patent Application No. PCT/KR2021/019805.

* cited by examiner

790

890

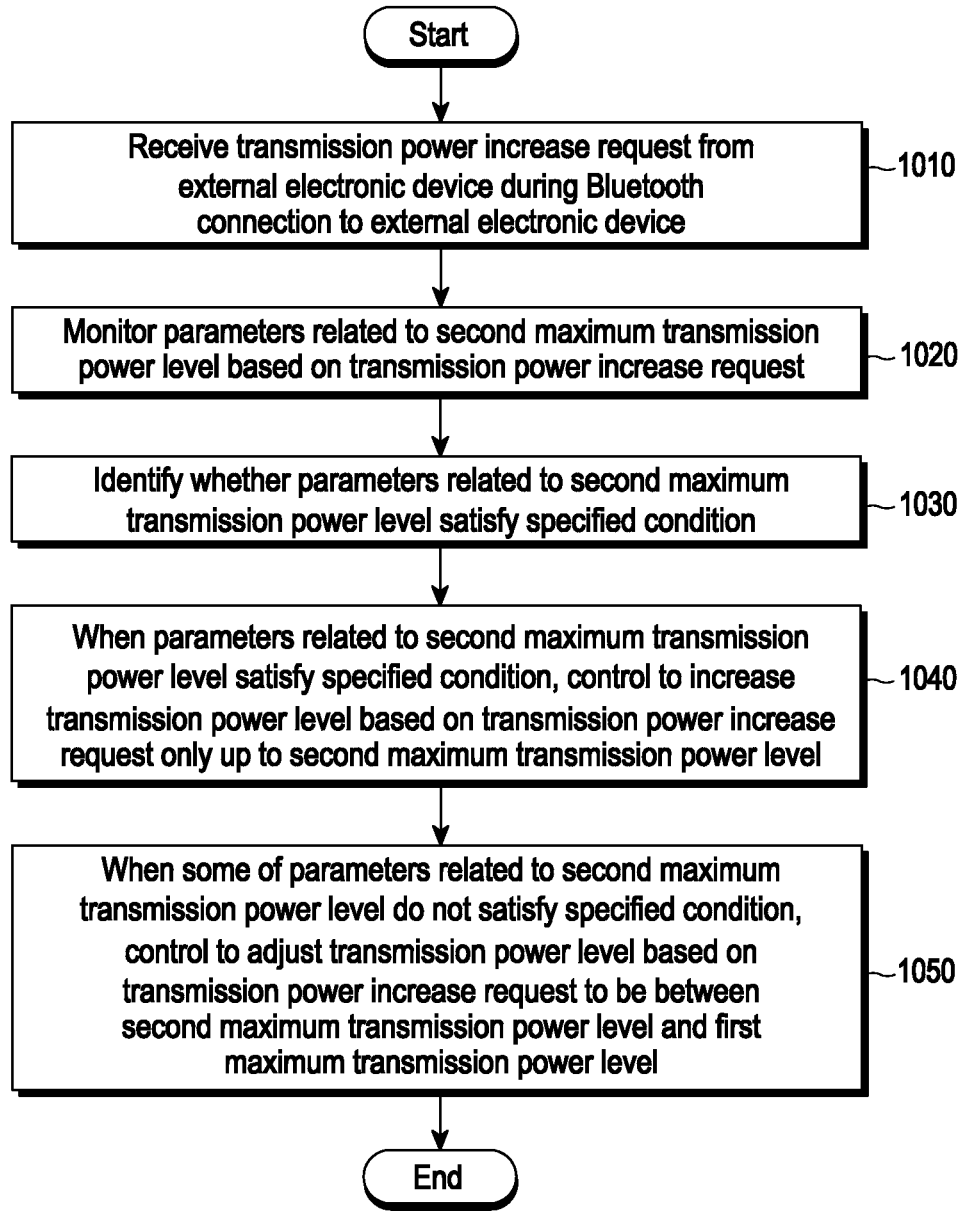

Start

Receive transmission power increase request from external electronic device during Bluetooth connection to external electronic device — 1010

Monitor parameters related to second maximum transmission power level based on transmission power increase request — 1020

Identify whether parameters related to second maximum transmission power level satisfy specified condition — 1030

When parameters related to second maximum transmission power level satisfy specified condition, control to increase transmission power level based on transmission power increase request only up to second maximum transmission power level — 1040

When some of parameters related to second maximum transmission power level do not satisfy specified condition, control to adjust transmission power level based on transmission power increase request to be between second maximum transmission power level and first maximum transmission power level — 1050

End

FIG. 10

ELECTRONIC DEVICE AND METHOD FOR CONTROLLING TRANSMISSION POWER BASED ON Bluetooth COMMUNICATION IN ELECTRONIC DEVICE

CROSS-REFERENCE TO RELATED APPLICATION(S)

This application is a continuation application, claiming priority under § 365(c), of an International application No. PCT/KR2021/019805, filed on Dec. 24, 2021, which is based on and claims the benefit of a Korean patent application number 10-2021-0004661, filed on Jan. 13, 2021, in the Korean Intellectual Property Office, the disclosure of which is incorporated by reference herein in its entirety.

BACKGROUND

1. Field

The disclosure relates to an electronic device and Bluetooth communication in the electronic device.

2. Description of Related Art

Various electronic devices are provided to users, and the users may use various types of content, while carrying the electronic devices. Such an electronic device may be connected to an external device by a wireless access technology and provide an extended function in connection to the external device. For example, the electronic device may use a Bluetooth network technology among various wireless network interfaces.

The Bluetooth network technology may include a Bluetooth legacy (or classic) network or a Bluetooth low energy (BLE) network, and have various connection types of topologies such as piconet and scatternet. For example, electronic devices may connect Bluetooth communication with each other with various topologies such as 1:1, 1:N, or N:N. In the case of a 1:1 connection, one electronic device may be connected to another electronic device based on Bluetooth legacy or BLE, and operate as a controller (or master) or a controllee (or slave) during connection setup.

The above information is presented as background information only to assist with an understanding of the disclosure. No determination has been made, and no assertion is made, as to whether any of the above might be applicable as prior art with regard to the disclosure.

SUMMARY

During Bluetooth communication between electronic devices, transmission power may be controlled based on a Bluetooth link manager protocol (LMP). For example, in a state in which an electronic device (e.g., a transmitting electronic device or a master) has established a Bluetooth connection with an external electronic device (e.g., a receiving electronic device or a slave), the electronic device may increase or decrease transmission power based on a transmission power change request from the external electronic device during data transmission.

For example, the external electronic device may request a transmission power level to be increased by one step or to a maximum transmission power level by a transmission power increase request message LMP_incr_power_req or a maximum transmission power request message LMP_max_power, and the electronic device may increase the transmission power level by one step or to the maximum transmission power level based on the transmission power increase request.

For example, when the external electronic device is an audio device (e.g., an audio Bluetooth headset or a car audio system) and receives an audio signal from the electronic device by Bluetooth communication, the external electronic device may request transmission power at a level (e.g., the maximum power level) higher than a transmission power level that may satisfy an audio signal reception quality from the electronic device in order to prevent poor quality of an audio signal such as sound dropouts. When the transmission power level higher than the transmission power level that may satisfy the reception quality of an audio signal is requested to the electronic device, the unnecessary power level increase may cause unnecessary current consumption.

Aspects of the disclosure are to address at least the above-mentioned problems and/or disadvantages and to provide at least the advantages described below. Accordingly, an aspect of the disclosure is to provide a method of controlling transmission power based on Bluetooth communication may be provided, in which an electronic device sets a power level lower than a first maximum transmission power level available to the electronic device as a second maximum transmission power level during Bluetooth-based transmission.

Additional aspects will be set forth in part in the description which follows and, in part, will be apparent from the description, or may be learned by practice of the presented embodiments.

In accordance with an aspect of the disclosure, an electronic device is provided. The electronic device includes a Bluetooth communication module, memory, and a processor operatively connected to the Bluetooth communication module and the memory. The processor may be configured to receive a transmission power increase request from an external electronic device through the Bluetooth communication module during a Bluetooth communication connection to the external electronic device, compare a transmission power level based on the received increase request with a second maximum transmission power level designated to be lower than a first maximum transmission power level providable by the electronic device, when the transmission power level based on the received increase request is lower than the second maximum transmission power level, increase a transmission power level of the Bluetooth communication module and then control to transmit a message indicating the transmission power level increase to the external electronic device, and when the transmission power level based on the received increase request is equal to or higher than the second maximum transmission power level, transmit a message indicating that the transmission power level of the Bluetooth communication module is a maximum transmission power level to the external electronic device, without increasing the transmission power level of the Bluetooth communication module.

In accordance with another aspect of the disclosure, a method of controlling transmission power in an electronic device is provided. The method includes receiving a transmission power increase request from an external electronic device through a Bluetooth communication module during a Bluetooth communication connection to the external electronic device, comparing a transmission power level based on the received increase request with a second maximum transmission power level designated to be lower than a first maximum transmission power level providable by the electronic device, when the transmission power level based on the received increase request is lower than the second maximum transmission power level, increasing a transmission power level of the Bluetooth communication module and then transmitting a message indicating the transmission power level increase to the external electronic device, and when the transmission power level based on the received increase request is equal to or higher than the second maximum transmission power level, controlling to transmit a message indicating that the transmission power level of the Bluetooth communication module is a maximum transmission power level to the external electronic device, without increasing the transmission power level.

In accordance with another aspect of the disclosure, a non-volatile storage medium that stores instructions configured to, when executed by at least one processor, causes the at least one processor to perform at least one operation, is provided. The at least one operation includes receiving a transmission power increase request from an external electronic device through a Bluetooth communication module during a Bluetooth communication connection to the external electronic device, comparing a transmission power level based on the received increase request with a second maximum transmission power level designated to be lower than a first maximum transmission power level providable by the electronic device, when the transmission power level based on the received increase request is lower than the second maximum transmission power level, increasing a transmission power level of the Bluetooth communication module and then transmitting a message indicating the transmission power level increase to the external electronic device, and when the transmission power level based on the received increase request is equal to or higher than the second maximum transmission power level, controlling to transmit a message indicating that the transmission power level of the Bluetooth communication module is a maximum transmission power level to the external electronic device, without increasing the transmission power level.

According to various embodiments, an electronic device may set a power level lower than an available first maximum transmission power level as a second maximum transmission power, and upon receipt of a transmission power increase request from an external electronic device, control a transmission power level not to exceed the second maximum transmission power level during Bluetooth-based transmission.

According to various embodiments, the electronic device may set the first maximum transmission power level available to the electronic device and the second maximum transmission power level lower than the first maximum transmission power level based on whether a Bluetooth communication module uses a single antenna or multiple antennas, a single core (processor) or multiple cores (processors), or an internal power amplifier (iPA) or an external power amplifier (ePA), and actively control transmission power.

According to various embodiments, the electronic device may allow efficient transmission power control by monitoring at least one parameter related to the second maximum transmission power level and changing the second maximum transmission power level based on the result of the parameter monitoring.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 10 is a flowchart illustrating an operation of controlling a transmission power level based on a second maximum transmission power level in an electronic device according to an embodiment of the disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms and words as used herein, including technical or scientific terms, may have the same meanings as generally understood by those skilled in the art. The terms as generally defined in dictionaries may be interpreted as having the same or similar meanings as or to contextual meanings of the relevant art. Unless otherwise defined, the terms should not be interpreted as ideally or excessively formal meanings. Even though a term is defined in the disclosure, the term should not be interpreted as excluding embodiments of the disclosure under circumstances.

Figure 1:
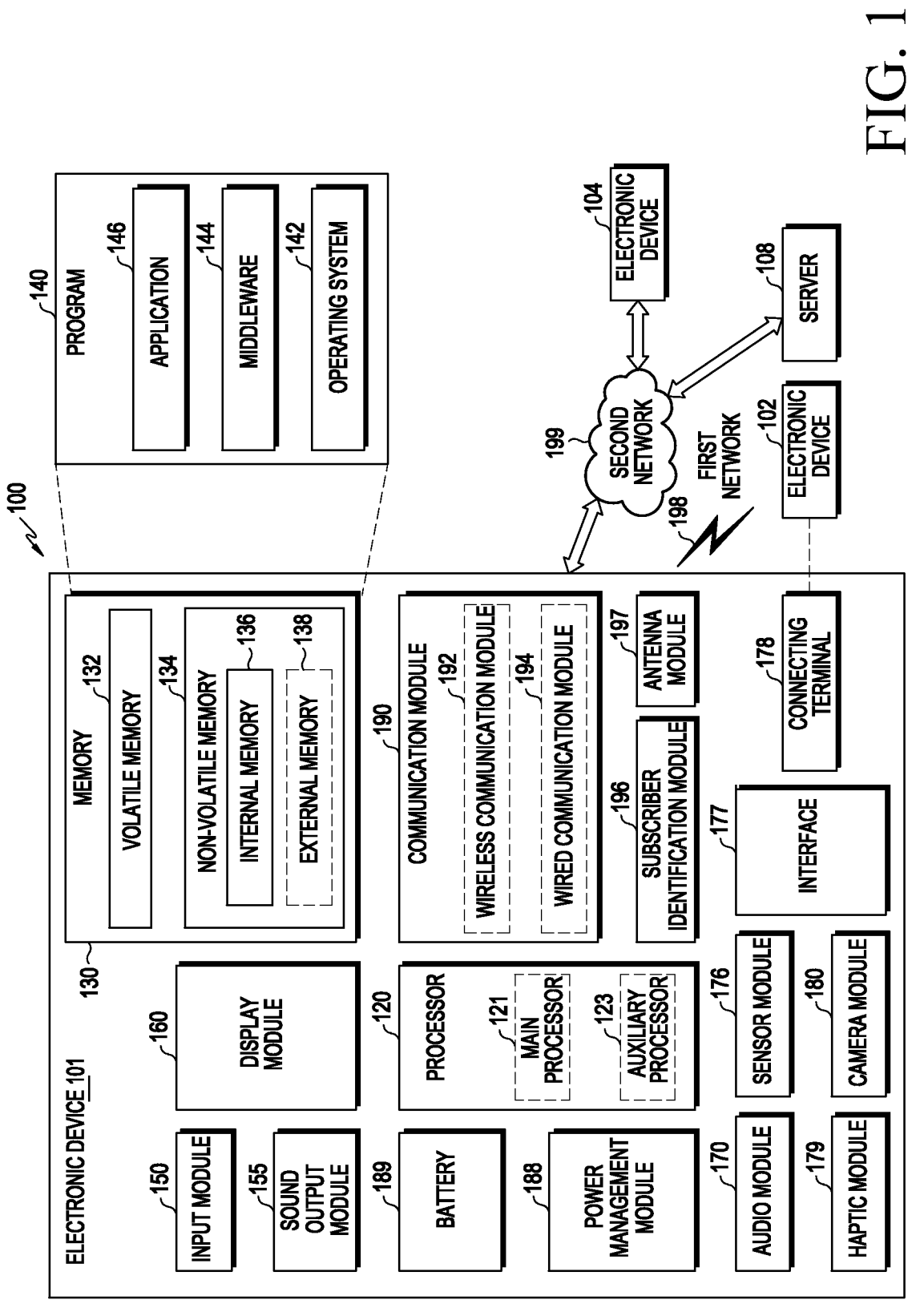
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, an RFIC disposed on a first surface (e.g., the bottom surface) of the printed circuit board, or adjacent to the first surface and capable of supporting a specified high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the specified high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
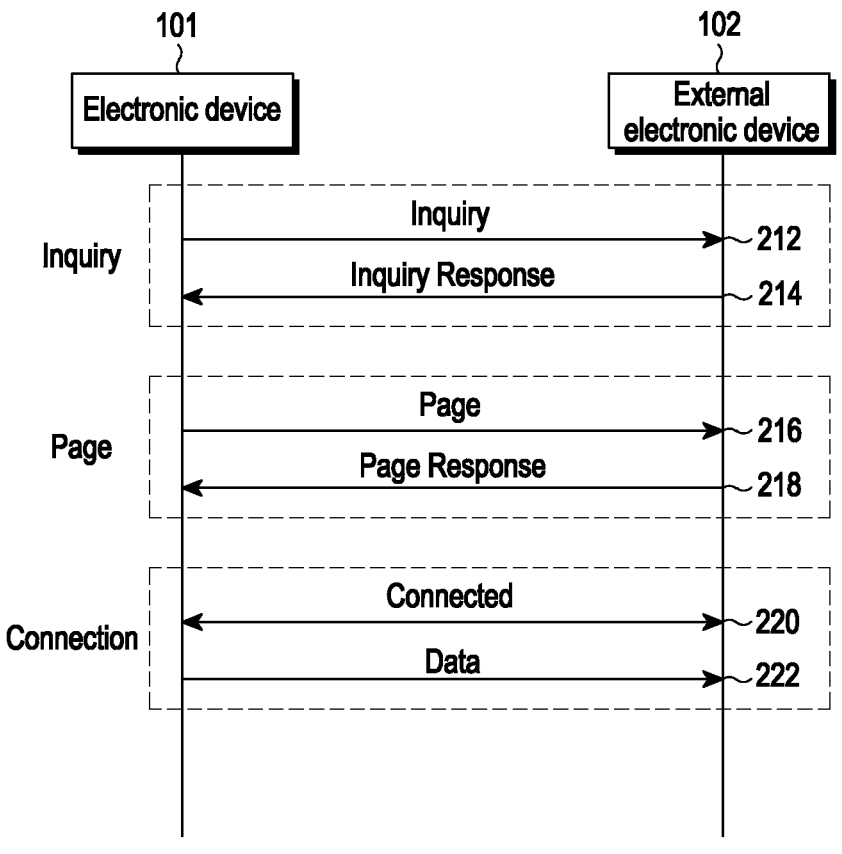
FIG. 2 is a diagram illustrating a Bluetooth connection operation between an electronic device and an external electronic device according to an embodiment of the disclosure.

FIG. 2 is a diagram illustrating a Bluetooth connection operation between an electronic device and an external electronic device according to an embodiment of the disclosure.

Referring to FIG. 2, an electronic device (e.g., the electronic device 101 of FIG. 1) according to an embodiment may operate as a master device, and an external electronic device (e.g., the electronic device 102 of FIG. 1) may operate as a slave device. The electronic device 101 according to an embodiment may establish a Bluetooth (e.g., Bluetooth legacy) communication connection with the external electronic device 102 through inquiry, paging, and connection operations.

In operation 212, the electronic device 101 according to an embodiment may enter an inquiry mode and output an inquiry signal to identify (or discover) a neighbor device. For example, upon request of a user, upon power-on, or when neighbor device search is required, the electronic device 101 may enter a neighbor device search mode for a Bluetooth communication connection and output an inquiry signal in the neighbor device search mode.

According to an embodiment, the electronic device 101 may continuously transmit an identification (ID) packet generated based on a general inquiry access code (GIAC) during a specified inquiry period, and the external electronic device 102 may receive the ID packet transmitted by the electronic device 101 by inquiry scan. For example, the ID packet may include an access code such as an inquiry access code (IAC), a device access code (DAC), or a channel access code (CAC). Upon receipt of the ID packet, the external electronic device 102 according to an embodiment may transmit a frequency hop synchronization (FHS) packet to the electronic device 101 in response to the ID packet. For example, the FHS packet may include BD_ADDR of the external electronic device 102, a class of device (COD) indicating the type of the external electronic device 102, an extended inquiry response (EIR) bit indicating that there is a next packet including more information, or clock information of the external electronic device 102. After transmitting the FHS packet, the external electronic device 102 according to various embodiments may further transmit an EIR packet to the electronic device 101, in the presence of a next packet including more information. The electronic device 101 according to an embodiment may provide information about the detected external electronic device 102 (e.g., display a UI or output an audio signal) according to the reception of the FHS packet.

According to an embodiment, the FHS packet may include the fields of parity bits, lower address part (LAP), extended inquiry response (EIR), reserved, scan repetition (SR), scan period (SP), upper address part (UAP), NAP (non-significant address part), class of device, logical transport address (LT_ADDR), clock (CLK), or/and page scan mode. According to an embodiment, the fields of parity bits, LAP, EIR, reserved, SR, SP, UAP, NAP, class of device, LT_ADDR, CLK, or/and page scan mode may be included in a Bluetooth specification, and those skilled in the art may refer to the Bluetooth specification, for a specific configuration of each field.

According to an embodiment, the external electronic device 102 may provide at least one of its own BD_ADDR, Type, or clock information to the electronic device 101 by the FHS packet, and indicate that an EIR packet including more information will be transmitted by the EIR field.

According to an embodiment, the EIR packet may include a plurality of EIR data structures, and each EIR data structure may include a length field and a data field. According to an embodiment, the data field may include an EIR data type and EIR data. According to an embodiment, the external electronic device 102 may transmit various pieces of information such as a device name, a transmission power level, service class universal unique identifiers (UUIDs), or manufacture's data of the external electronic device 102 to the electronic device 101 by using the EIR data type and the EIR data, for use in a Bluetooth connection and service.

According to an embodiment, the electronic device 101 may provide various services related to Bluetooth communication as well as the Bluetooth communication connection, based on the EIR data type and the EIR data included in the EIR packet received in an inquiry operation.

In operation 214, upon receipt of the inquiry signal, the external electronic device 102 according to an embodiment may transmit an inquiry response signal in response to the inquiry signal, and enter a page (or paging) mode.

In operation 216, the electronic device 101 according to an embodiment may enter the paging mode and perform page scan, upon receipt of the inquiry response signal from the external electronic device 101.

According to an embodiment, upon receipt of the inquiry response signal, the electronic device 101 may transmit an ID packet corresponding to BD_ADDR of the electronic device 101 in the paging mode. According to an embodiment, the electronic device 101 may calculate a DAC using BD_ADDR of the electronic device 101 and transmit an ID packet including the calculated DAC to the external electronic device 102. According to an embodiment, the electronic device 101 may determine an ID packet transmission period in consideration of task priority, power, or/and a battery capacity, and transmit the ID packet at intervals of the determined period. According to an embodiment, the electronic device 101 may continuously transmit the ID packet during a specified time period. For example, the electronic device 101 may transmit the ID packet a plurality of times per slot by calculating a hopping channel based on BD_ADDR of the electronic device 101, and identify whether a response has been received from the external electronic device 102 by opening a slot next to a transmission slot to receive the response to the transmitted ID packet.

The electronic device 101 according to an embodiment may perform page scan at every specified time, using its own BD_ADDR. For example, the electronic device 101 may perform the page scan every specified period. For example, the page scan period may be changed according to the power or/and battery capacity of the electronic device 101. According to an embodiment, the electronic device 101 may open tens of channels at intervals of a specified time according to a method defined in a Bluetooth specification during the page scan. The electronic device 101 may identify whether an ID packet corresponding to its own BD_ADDR has been received through an open channel.

In operation 218, the external electronic device 102 according to an embodiment may transmit a page response signal, upon receipt of a page signal from the electronic device 101. When the external electronic device 102 according to an embodiment identifies reception of an ID packet corresponding to its own BD_ADDR through an open channel, it may transmit an ID packet response in the same ID packet through a corresponding channel.

In operation 220, after receiving the page response signal from the external electronic device 102, the electronic device 101 according to an embodiment may transmit a connected signal indicating connection to the external electronic device 102, and perform a connection procedure with the external electronic device 102. Upon receipt of the ID packet from the external electronic device 102, the electronic device 101 according to an embodiment may calculate a hopping channel using clock information shared with the external electronic device 102 and its own BD_ADDR, and transmit a first traffic packet (e.g., a first POLL packet) to the external electronic device 102 through the calculated hopping channel. Upon receipt of the first traffic packet from the electronic device 101, the external electronic device 102 may transmit a first traffic packet response in response to the first traffic packet. According to an embodiment, as the electronic device 101 transmits the first traffic packet and the external electronic device 102 transmits the first traffic packet response, a basic data rate (BDR)/enhanced data rate (EDR)-based Bluetooth communication connection (or link) may be established.

In operation 222, as the electronic device 101 according to an embodiment is connected to the external electronic device 201, it may transmit data to the external electronic device 102.

Figure 3:
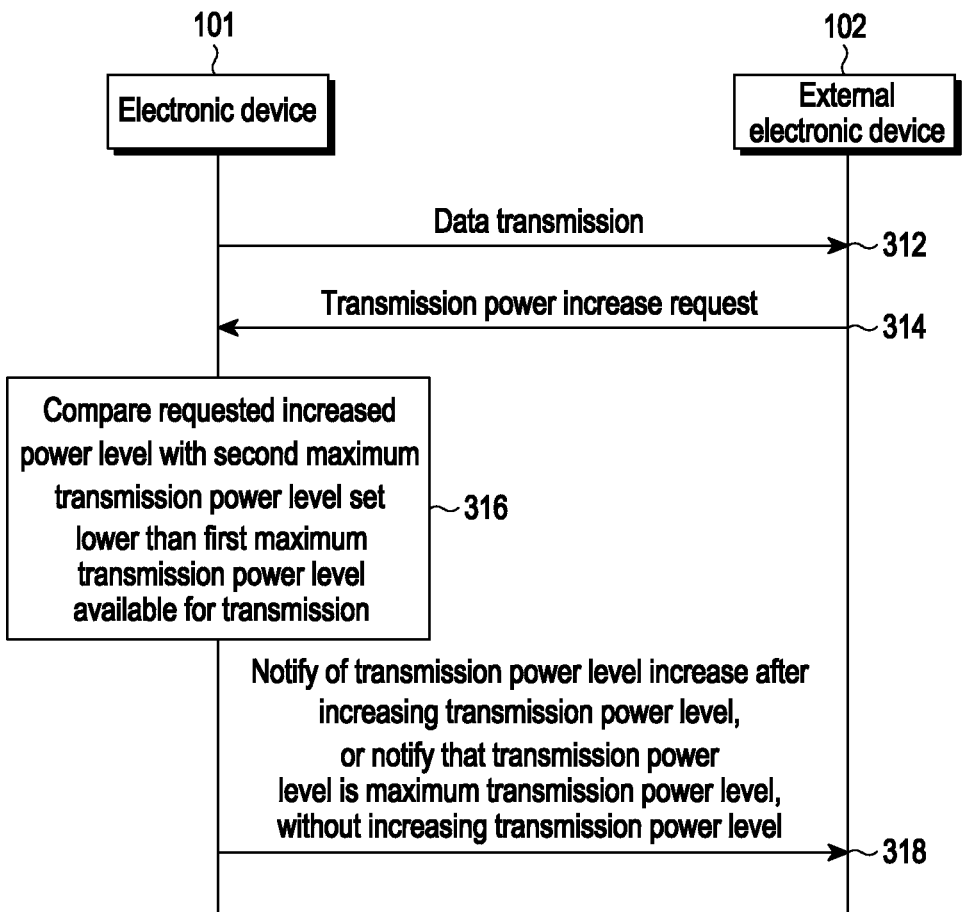
FIG. 3 is a diagram illustrating an operation based on a transmission power increase request from an external electronic device in a Bluetooth connection state between an electronic device and the external electronic device according to an embodiment of the disclosure.

FIG. 3 is a diagram illustrating an operation based on a transmission power increase request from an external electronic device in a Bluetooth connection state between an electronic device and the external electronic device according to an embodiment of the disclosure.

Referring to FIG. 3, in operation 312, an electronic device (e.g., the electronic device 101 of FIG. 1) according to an embodiment may transmit data to an external electronic device (e.g., the electronic device 102 of FIG. 1) in a Bluetooth communication-connected state between the electronic device 101 and the external electronic device 102.

In operation 314, the external electronic device 102 according to an embodiment may request a transmission power increase. For example, the external electronic device 102 may request to increase a transmission power level by one step or to a maximum transmission power level by a transmission power increase request message LMP_incr_power_req or a maximum transmission power request message (LMP_max_power).

In operation 316, the electronic device 101 according to an embodiment may compare a power level based on the increase request with a second maximum transmission power level set to be lower than a first maximum transmission power level available for transmission, based on the transmission power increase request. According to an embodiment, the first maximum transmission power level providable by the electronic device 101 may be determined based on whether a Bluetooth communication module of the electronic device 101 uses a single antenna or multiple antennas, whether the Bluetooth communication module uses a single core (processor) or multiple cores (processors), or whether the Bluetooth communication module uses an internal power amplifier (iPA) or an external power amplifier (ePA). According to an embodiment, the second maximum transmission power level, which is a value set lower than the first maximum transmission power level, may be a maximum transmission power level in the case of using a single antenna, a single core, or an iPA at the Bluetooth communication module of the electronic device 101 or also in an example of the case of using a different combination at the Bluetooth communication module. According to an embodiment, the second maximum transmission power level may be set to be optimized during manufacturing according to the electronic device 101 or by learning of the electronic device 101.

In operation 318, after increasing the transmission power level, the electronic device 101 according to an embodiment may notify the external electronic device 102 that the transmission power level (or an increase in a transmission power value, which is hereinafter referred to as a transmission power level) has been increased or that a current transmission power level is a maximum transmission power level, without increasing the transmission power level. For example, when the power level based on the transmission power level increase request is lower than the second maximum transmission power level, the electronic device 101 may notify of the transmission power level increase after increasing the transmission power level. For example, when the power level based on the increase request is equal to or higher than the second maximum transmission power level, the electronic device 101 may notify the external electronic device 102 that the current transmission power level (e.g., the second maximum transmission power level) is the maximum transmission power level, without increasing the transmission power level.

Figure 4:
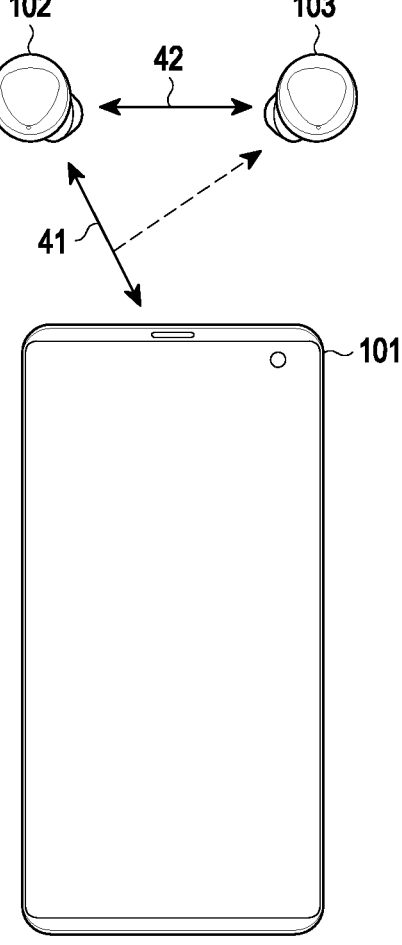
FIG. 4 is a diagram illustrating an electronic device and an external electronic device according to an embodiment of the disclosure.

FIG. 4 is a diagram illustrating an electronic device and an external electronic device according to an embodiment of the disclosure.

Referring to FIG. 4, an electronic device 101 according to various embodiments may be a device (or a smartphone) that transmits audio data, and the external electronic device 102 may be a device that receives audio data (e.g., a wireless earphone or a wireless speaker). According to various embodiments, although the electronic device 101 and the external electronic device 102 are capable of performing Bluetooth communication based on various Bluetooth topologies, the following description will be given in the context of Bluetooth communication connections among a smartphone, a first earphone, and a second earphone. In addition, various other Bluetooth communication connections may be available.

The electronic device 101 according to an embodiment may establish a first Bluetooth communication connection 41 with the external electronic device (e.g., a first earphone, a main earphone, or a right earphone) 102 based on first Bluetooth communication (e.g., Bluetooth legacy). The electronic device 101 may transmit audio data or an audio signal to the external electronic device 102 through the first Bluetooth communication connection 41 to the external electronic device 102, so that the audio data or the audio signal is output through a speaker of the external electronic device 102. The external electronic device 102 according to an embodiment may establish a second communication connection 42 based on second Bluetooth communication (BLE) with another paired external electronic device 103 (e.g., a second earphone, a sub earphone, or a left earphone), while establishing the first Bluetooth communication connection 41 with the electronic device 101. The external electronic device 102 according to various embodiments may transmit audio data or an audio signal received from the electronic device 101 or information related to the first Bluetooth communication connection 41 to the other external electronic device 103 through the second communication connection 42, so that the other external electronic device 103 obtains the audio data or the audio signal from the electronic device 101.

According to an embodiment, the electronic device 101 may receive a transmission power increase request from the external electronic device 102 while or before transmitting the audio data or the audio signal to the external electronic device 102 through the first Bluetooth communication connection 41 to the external electronic device 102. The transmission power increase request may include a request to increase the transmission power level by one step or to a maximum transmission power level.

According to an embodiment, the electronic device 101 may compare a power level based on the transmission power increase request with a second maximum transmission power level set to be lower than a first maximum transmission power level available for transmission. According to an embodiment, the first maximum transmission power level providable by the electronic device 101 may be determined based on whether the Bluetooth communication module of the electronic device 101 uses a single antenna or multiple antennas, whether the Bluetooth communication module uses a single core (processor) or multiple cores (processors), or whether the Bluetooth communication module uses an iPA or an ePA. According to an embodiment, the second maximum transmission power level, which is a value set lower than the first maximum transmission power level, may be a maximum transmission power level in the case of using a single antenna, a single core, or an iPA at the Bluetooth communication module of the electronic device 101 or also in an example of the case of using a different combination at the Bluetooth communication module. According to an embodiment, the second maximum transmission power level may be set to be optimized during manufacturing according to the electronic device 101 or by learning of the electronic device 101.

According to an embodiment, when the power level based on the transmission power increase request is lower than the second maximum transmission power level, the electronic device 101 may seamlessly transmit audio data or an audio signal by increasing a transmission power level and notify of the increase of the transmission power level. According to another embodiment, when the power level based on the transmission power increase request is equal to or higher than the second maximum transmission power level, the electronic device 101 may seamlessly transmit audio data or an audio signal without increasing the transmission power level, and notify that a current transmission power level (e.g., the second maximum transmission power level) is the maximum transmission power level.

Figure 5:
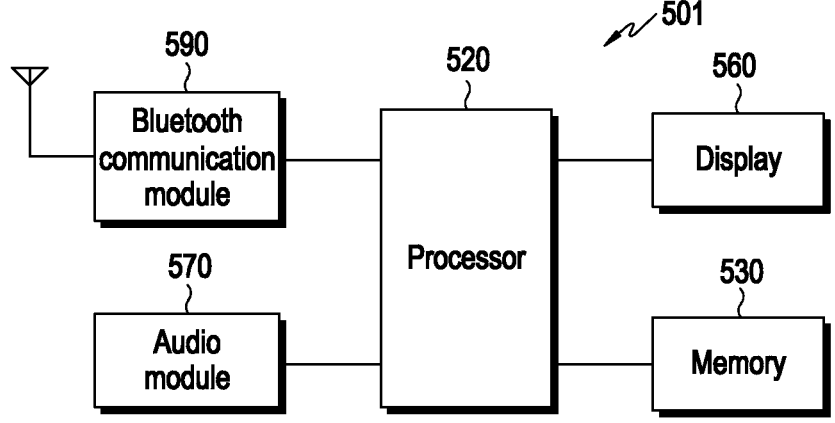
FIG. 5 is a block diagram illustrating the configuration of an electronic device according to an embodiment of the disclosure.

FIG. 5 is a block diagram illustrating the configuration of an electronic device according to an embodiment of the disclosure.

Referring to FIG. 5, an electronic device 501 (e.g., the electronic device 101 of FIG. 1) according to an embodiment may include a processor 520, memory 530, a display 560, an audio module 570, and a Bluetooth communication module 590.

The processor 520 according to an embodiment may provide overall control to operations of the electronic device 501. The processor 520 according to an embodiment may control to establish a Bluetooth connection with the external electronic device 102 through the Bluetooth communication module 590. The processor 520 according to an embodiment may receive a transmission power increase request from the external electronic device 102 through the Bluetooth communication module 590. For example, the external electronic device 102 may request to increase a transmission power level by one step or to a maximum transmission power level by a transmission power increase request message (LMP_incr_power_req) or a maximum transmission power request message (LMP_max_power). The processor 520 according to an embodiment may control the Bluetooth communication module 590 to compare the requested increased transmission power level with a second maximum transmission power level set to be lower than a first maximum transmission power level providable by the electronic device 501, based on the transmission power increase request. According to an embodiment, the first maximum transmission power level providable by the electronic device 501 may be determined based on whether the Bluetooth communication module 590 of the electronic device 501 uses a single antenna or multiple antennas, whether the Bluetooth communication module 590 uses a single core (processor) or multiple cores (processors), and/or whether the Bluetooth communication module 590 uses an iPA and/or an ePA. According to an embodiment, the second maximum transmission power level may be a transmission power level in the case of transmission using a single antenna, a single core, and a single iPA at the Bluetooth communication module 590 of the electronic device 501. When the power level based on the transmission power increase request received through the Bluetooth communication module 590 is lower than the second maximum transmission power level, the processor 520 according to an embodiment may control the Bluetooth communication module 590 to increase the transmission power level and then notify of the increase of the transmission power level. For example, the Bluetooth communication module 590 may increase a current power level by one step based on transmission power level information stored in the memory 530, and transmit a message indicating that the transmission power level has been increased to the electronic device 102. When the power level based on the transmission power increase request received through the Bluetooth communication module 590 is equal to or higher than the second maximum transmission power level, the processor 520 according to an embodiment may control the Bluetooth communication module 590 to transmit a message indicating that the current transmission power level is a maximum transmission power level to the electronic device 102, without increasing the transmission power level.

The processor 520 according to an embodiment may monitor parameters related to the second maximum transmission power level during the Bluetooth connection to the external electronic device 102. According to an embodiment, the parameters related to the second maximum transmission power level may include a received signal strength indicator (RSSI), a packet retransmission rate, or/and an available channel count. The RSSI may be the received strength of a Bluetooth signal received from the external electronic device 102. The packet retransmission rate may be a retransmission rate of data received from the external electronic device 102. The available channel count may be the number of available channels among channels used for Bluetooth communication.

The processor 520 according to an embodiment may determine (identify) whether to increase the power level based on the transmission power increase request only up to the second maximum transmission power level based on the parameters related to the second maximum transmission power level.

For example, the processor 520 may control to increase the power level based on the transmission power increase request received through the Bluetooth communication module 590 only to the second maximum transmission power, when the parameters related to the second maximum transmission power level satisfy a specified condition. For example, in the case where at least some of the parameters related to the second maximum transmission power level do not satisfy the specified condition, when the power level based on the transmission power increase request is equal to or higher than the second maximum transmission power level, the processor 520 may control the Bluetooth communication module 590 to adjust the transmission power level to be between the second maximum transmission power level and the first maximum transmission power level, ignoring the second maximum transmission power level.

According to an embodiment, the condition specified for the parameters related to the second maximum transmission power level may be an RSSI value equal to or greater than a reference range, a data retransmission rate less than a reference retransmission rate range, or an available channel count equal to or greater than a reference range. For example, each reference range may be determined according to a communication environment.

The memory 530 according to an embodiment may be operatively connected to the processor 520 and store instructions causing the processor 520 to perform the above-described operations. The memory 530 according to an embodiment may store transmission power level information. The transmission power level information may include a plurality of transmission power level steps (or indices). For example, the plurality of transmission power level steps may be obtained by dividing a transmission power level range providable by the electronic device 501 in a stepwise manner. For example, the transmission power level range providable by the electronic device 501 may include a first maximum transmission power level range and a second maximum transmission power level range, and may further include at least one transmission power level range between the first maximum transmission power level range and a second maximum transmission power level range. For example, the first maximum transmission power level may be a maximum transmission power level actually providable by the electronic device 501, and determined based on whether the Bluetooth communication module 590 of the electronic device 501 uses a single antenna or multiple antennas, whether the Bluetooth communication module 590 uses a single core (processor) or multiple cores (processors), and/or whether the Bluetooth communication module 590 uses an iPA or an ePA. For example, the second maximum transmission power level range, which is a transmission power level range set to be lower than the first maximum transmission power level, may be a transmission power level in the case of using a single antenna, a single core, and/or an iPA at the Bluetooth communication module of the electronic device 501 or in the case of using a different combination of components at the Bluetooth communication module. According to an embodiment, the second maximum transmission power level may be set to be optimized during manufacturing according to the electronic device 501 or by learning of the electronic device 101.

The display 560 according to an embodiment may display various types of display information provided in a Bluetooth communication connection process with the external electronic device 102 under the control of the processor 520. The display 560 according to an embodiment may display various types of display information used to transmit data or a signal (e.g., audio data or an audio signal) to the external electronic device 102 under the control of the processor 520.

The audio module 570 according to an embodiment may reproduce audio content or audio data and output a sound corresponding to the audio content or the audio data under the control of the processor 520.

The Bluetooth communication module 590 according to an embodiment may perform Bluetooth communication under the control of the processor 520. For example, the Bluetooth communication module 590 may include a single core (processor) or multiple cores (processors), an iPA, and/or an ePA, and use a single antenna or multiple antennas.

Figure 6:
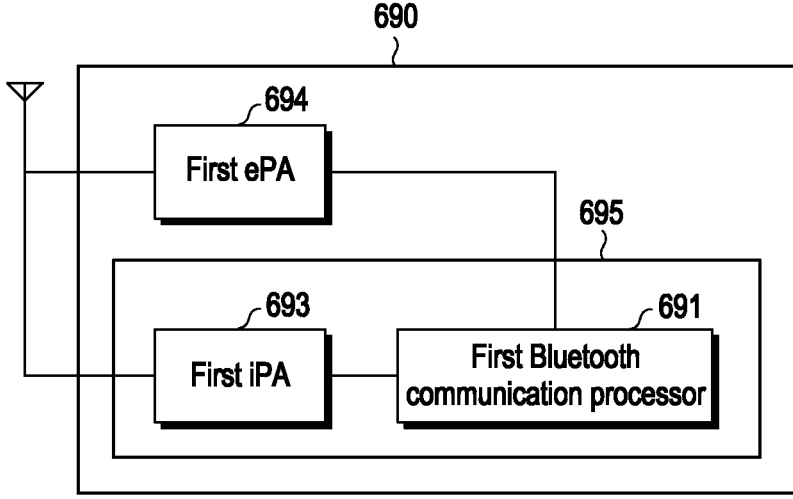
FIG. 6 is a diagram illustrating a first Bluetooth communication module according to an embodiment of the disclosure.

FIG. 6 is a diagram illustrating a first Bluetooth communication module according to an embodiment of the disclosure.

Referring to FIG. 6, a first Bluetooth communication module 690 (e.g., the wireless communication module 192 of FIG. 1 or the Bluetooth communication module 590 of FIG. 5) according to an embodiment may include a first Bluetooth communication processor (or a first core) 691, a first iPA 693, and a first ePA 694. For example, the first Bluetooth communication processor 691 and the first iPA 693 may be included in one integrated chip (IC) 695. The first ePA 694 may be disposed outside the IC 695 and increase a higher transmission power level further than the first iPA 693.

The first Bluetooth communication processor 691 according to an embodiment may convert data to be transmitted into a transmission Bluetooth signal and output the transmission Bluetooth signal, or may convert a received Bluetooth signal into received data. The first Bluetooth communication processor 691 according to an embodiment may cause the transmission Bluetooth signal to be transmitted at a first transmission power level through the first iPA 693 or at a higher level than the first transmission power level through the first ePA 694. For example, the first Bluetooth communication processor 691 may change a transmission power transmission mode by selectively using the first iPA 692 or the first ePA 694, and the transmission power level may be changed according to the transmission power transmission mode.

For example, transmission power level information related to the first Bluetooth communication module 690 may be given as shown in Table 1 below.

TABLE 1

| Transmission power mode | BDR(dBm) | EDR(dBm) |
| --- | --- | --- |
| First ePA used | 19 | 15 |
| First iPA used | 14 | 10 |
| | 10 | 6 |
| | 6 | 2 |
| | 2 | -2 |
| | -2 | -6 |
| | -6 | -10 |
| | -10 | -14 |

Referring to Table 1, the first maximum transmission power level providable by the first Bluetooth communication module 690 according to an embodiment may be for a mode using the second ePA 69, and may be 419 dbm for a BDR packet and 15 dbm for an EDR packet. The second maximum transmission power level lower than the first maximum transmission power level in the first Bluetooth communication module 690 according to an embodiment, which is a maximum transmission power providable using the first iPA 693 without the first ePA 694, may be 14 dbm for a BDR packet and 10 dbm for an EDR packet. For example, as far as it may be set a value lower than the first maximum transmission power, the second maximum transmission power level may be determined by another criterion in addition to the above criterion. For example, the second maximum transmission power level may be set based on characteristics of the electronic device 501 or the types and transmission/reception characteristics of transmission/reception-related components related to the Bluetooth communication module included in the electronic device 501. According to an embodiment, the second maximum transmission power level may be set to be optimized during manufacturing according to the electronic device 501 or by learning of the electronic device 501.

Figure 7:
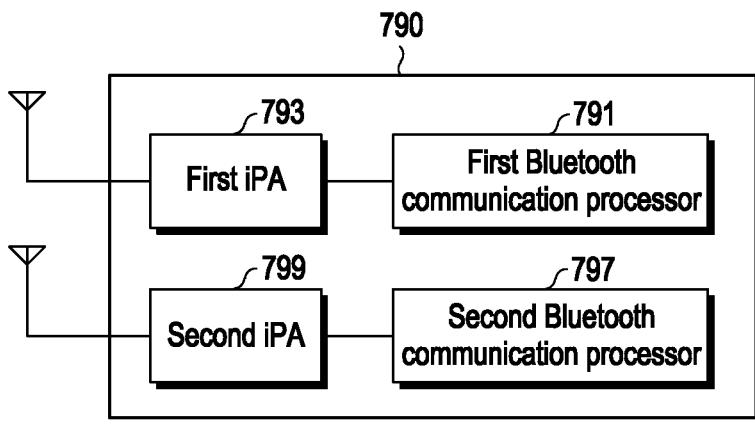
FIG. 7 is a diagram illustrating a second Bluetooth communication module according to an embodiment of the disclosure.

FIG. 7 is a diagram illustrating a second Bluetooth communication module according to an embodiment of the disclosure.

Referring to FIG. 7, a second Bluetooth communication module 790 (e.g., the wireless communication module 192 of FIG. 1 or the Bluetooth communication module 590 of FIG. 5) according to an embodiment may include a first Bluetooth communication processor (e.g., a first core) 791, a first iPA 793, a second Bluetooth communication processor (e.g., a second core) 797, and a second iPA 799. For example, the first Bluetooth communication processor 791, the first iPA 793, the second Bluetooth communication processor 797, and the second iPA 799 may be included in one IC. Compared to the case of using the first Bluetooth communication processor 791 and the first iPA 793, the transmission power level may be further increased in the case of using the first Bluetooth communication processor 791, the first iPA 793, the second Bluetooth communication processor 797, and the second iPA 799.

For example, the second Bluetooth communication module 790 may change a transmission power transmission mode by selectively using the first Bluetooth communication processor 791 and the first iPA 793 or using the first Bluetooth communication processor 791, the first iPA 793, the second Bluetooth communication processor 797, and the second iPA 799. The transmission power level may be changed according to the transmission power transmission mode.

For example, transmission power level information related to the second Bluetooth communication module 790 may be given as shown in Table 2 below.

TABLE 2

| Transmission power mode | BDR(dBm) | EDR(dBm) |
| --- | --- | --- |
| First iPA + second iPA used(multiple antennas) | 19 | 15 |
| First iPA used single antenna) | 14 | 10 |
| | 10 | 6 |
| | 6 | 2 |
| | 2 | -2 |
| | -2 | -6 |
| | -6 | -10 |
| | -10 | -14 |

Referring to Table 2, the first maximum transmission power level providable by the second Bluetooth communication module 790 according to an embodiment may be for a mode using the first iPA 793 and the second iPA 799, and may be 19 dbm for a BDR packet and 15 dbm for an EDR packet. The second maximum transmission power level lower than the first maximum transmission power level in the second Bluetooth communication module 790 according to an embodiment may be 14 dbm for a BDR packet and 10 dbm for an EDR packet, as a maximum transmission power level providable using the first iPA 793 without the second iPA 799. For example, as far as it may be set to a value lower than the first maximum transmission power, the second maximum transmission power level may be determined by another criterion in addition to the above criterion. For example, the second maximum transmission power level may be set based on characteristics of the electronic device 501 or the types and transmission/reception characteristics of transmission/reception-related components related to the Bluetooth communication module included in the electronic device 501. According to an embodiment, the second maximum transmission power level may be set to be optimized during manufacturing according to the electronic device 501 or by learning (e.g., machine learning, AI learning, or neural network learning of the electronic device 501.

Figure 8:
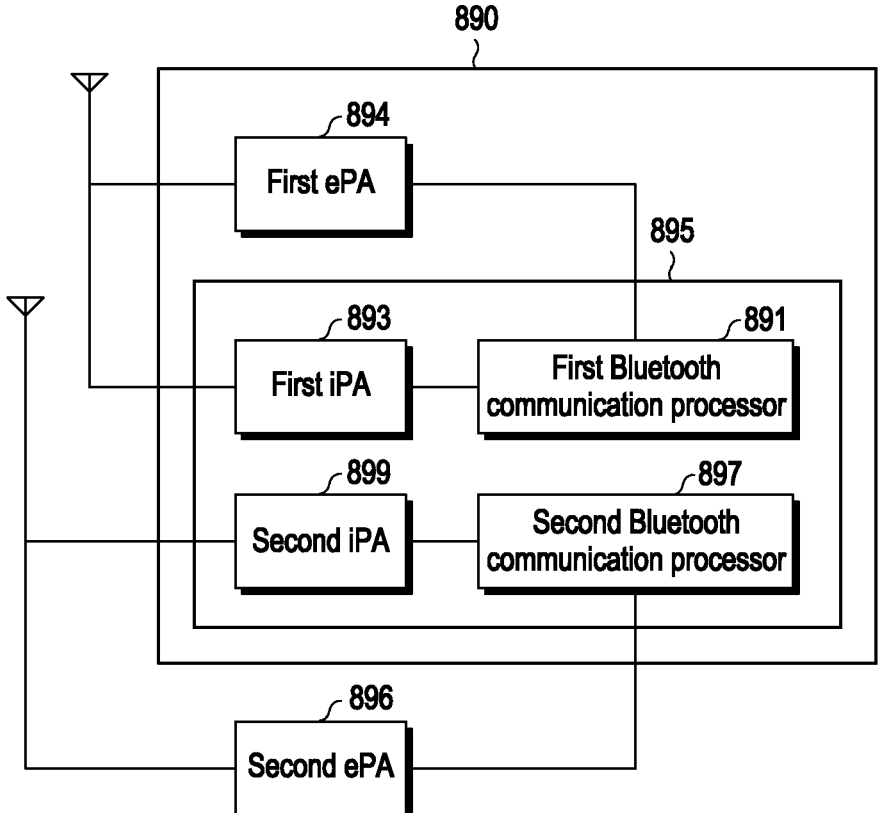
FIG. 8 is a diagram illustrating a third Bluetooth communication module according to an embodiment of the disclosure.

FIG. 8 is a diagram illustrating a third Bluetooth communication module according to an embodiment of the disclosure.

Referring to FIG. 8, a third Bluetooth communication module 890 (e.g., the wireless communication module 192 of FIG. 1 or the Bluetooth communication module 590 of FIG. 5) according to an embodiment may include a first Bluetooth communication processor (e.g., a first core) 891, a first iPA 893, a first ePA 894, a second Bluetooth communication processor (e.g., a second core) 897, a second iPA 899, and/or a second ePA 896. For example, the first Bluetooth communication processor 891, the first iPA 893, the second Bluetooth communication processor 897, and the second iPA 899 may be included in one IC 895. The first ePA 894 may be disposed outside the IC 895 and increase a transmission power level further than the first iPA 893. The second ePA 896 may be disposed outside the IC 895 and increase a transmission power level further than the second iPA 899.

For example, the third Bluetooth communication module 890 may change a transmission power transmission mode by selecting a mode using the first Bluetooth communication processor 891, the first iPA 893, and a single antenna, a mode using the second Bluetooth communication processor 897, the second iPA 899, and a single antenna, a mode using the first Bluetooth communication processor 891, the second Bluetooth communication processor 897, the first iPA 893, the second iPA 899, and multiple antennas, a mode using the first Bluetooth communication processor 891, the first ePA 894, and a single antenna, a mode using the second Bluetooth communication processor 897, the second ePA 896, and a single antenna, or a mode using the first Bluetooth communication processor 891, the second Bluetooth communication processor 897, the first ePA 894, the second ePA 896, and multiple antennas, and the transmission power level may be changed according to the transmission power transmission mode. For example, transmission power level information related to the third Bluetooth communication module 890 may be given as shown in Table 3 below.

TABLE 3

| Transmission power mode | BDR(dBm) | EDR(dBm) |
|---|---|---|
| First ePA + second ePA used (multiple antennas) | | 21 |
| First ePA or second ePA used (single antenna) | 19 | 15 |
| First iPA + second iPA used (multiple antennas) | 19 | 15 |
| First iPA or second iPA used (single antenna) | 14 | 10 |
| | 10 | 6 |
| | 6 | 2 |
| | 2 | -2 |
| | -2 | -6 |
| | -6 | -10 |
| | -10 | -14 |

Referring to Table 3, the first maximum transmission power level providable by the second Bluetooth communication module 790 according to an embodiment is for a mode using the first ePA 894 and the second ePA 896, and may be 21 dbm for an EDR packet. The second maximum transmission power level lower than the first maximum transmission power level in the third Bluetooth communication module 890 according to an embodiment may be 14 dbm for a BDR packet and 10 dbm for an EDR packet, as a maximum transmission power level that may be provided using the first iPA 893 and a single antenna. Although the above description is given in the context of a BDR packet and an EDR packet, transmission power level information related to the third Bluetooth communication module 890 may be determined to be a different LE-based value. According to various embodiments, as far as it may be set to a lower value than the first maximum transmission power, the second maximum transmission power level may be determined by another criterion in addition to the above criterion. For example, the second maximum transmission power level may be set based on characteristics of the electronic device 501 or the types and transmission/reception characteristics of transmission/reception-related components related to the Bluetooth communication module included in the electronic device 501. According to an embodiment, the second maximum transmission power level may be set to be optimized during manufacturing according to the electronic device 501 or by learning (e.g., machine learning, AI learning, or neural network learning) of the electronic device 501.

According to various embodiments, an electronic de (e.g., the electronic device 101 of FIG. 1 or the electronic device 501 of FIG. 5) may include a Bluetooth communication module (e.g., the communication module 190 of FIG. 1, the Bluetooth communication module 590 of FIG. 5, the first Bluetooth communication module 690 of FIG. 6, the second Bluetooth communication module 790 of FIG. 7, or the third Bluetooth communication module 890 of FIG. 8), memory (e.g., the memory 130 of FIG. 1 or the memory 530 of FIG. 5), and a processor (e.g., the processor 120 of FIG. 1 or the processor 520 of FIG. 5) operatively connected to the Bluetooth communication module and the memory. The processor may be configured to receive a transmission power increase request from an external electronic device through the Bluetooth communication module during a Bluetooth communication connection to the external electronic device, compare a transmission power level based on the received increase request with a second maximum transmission power level set to be lower than a first maximum transmission power level providable by the electronic device, when the transmission power level based on the received increase request is lower than the second maximum transmission power level, increase a transmission power level of the Bluetooth communication module and then control to transmit a message indicating the transmission power level increase to the external electronic device, and when the transmission power level based on the received increase request is equal to or higher than the second maximum transmission power level, transmit a message indicating that the transmission power level of the Bluetooth communication module is a maximum transmission power level to the external electronic device, without increasing the transmission power level of the Bluetooth communication module.

According to various embodiments, the Bluetooth communication module may include a first Bluetooth communication processor (e.g., the first Bluetooth communication processor 691 of FIG. 6), a first iPA (e.g., the first iPA 693 of FIG. 6), and a first ePA (e.g., the first ePA. 694 of FIG. 6).

According to various embodiments, the Bluetooth communication module may include a first Bluetooth communication processor (e.g., the first Bluetooth communication processor 791 of FIG. 7), a second Bluetooth communication processor (e.g., the second Bluetooth communication processor 797 of FIG. 7), a first iPA (e.g., the first iPA 793 of FIG. 7), and a second iPA (e.g., the second iPA 799 of FIG. 7).

According to various embodiments, the Bluetooth communication module may include a first Bluetooth communication processor (e.g., the first Bluetooth communication processor 891 of FIG. 8), a second Bluetooth communication processor (e.g., the second Bluetooth communication processor 797 of FIG. 8), a first iPA (e.g., the first iPA 893 of FIG. 8), a second iPA (e.g., the second iPA 799 of FIG. 8), a first ePA (e.g., the first ePA 894 of FIG. 8), and a second ePA (e.g., the second ePA 896 of FIG. 8).

According to various embodiments, the second maximum transmission power level may be a transmission power level based on the first Bluetooth communication processor and the first iPA.

According to various embodiments, the processor may monitor parameters related to the second maximum transmission power level.

According to various embodiments, the processor may control to adjust the transmission power level of the Bluetooth communication module to be equal to or lower than the second maximum transmission power level or to adjust the transmission power level of the Bluetooth communication module to be between the first maximum transmission power level and the second maximum transmission power level, based on a result of the monitoring of the parameters related to the second maximum transmission power level.

According to various embodiments, the parameters related to the second maximum transmission power level may include at least one of an RSSI, a packet retransmission rate, or an available channel count.

According to various embodiments, when the RSSI is less than a reference range, the packet retransmission rate is greater than a reference range, and/or the available channel count is equal to or greater than a reference count range in a Bluetooth communication connection state with the external electronic device, the processor may control to adjust the transmission power level of the Bluetooth communication module to be between the first maximum transmission power level and the second maximum transmission power level.

According to various embodiments, when the RSSI is equal to or greater than the reference range, the packet retransmission rate is equal to or greater than the reference range, and/or the available channel count is equal to or less than the reference count range in the Bluetooth communication connection state with the external electronic device, the processor may control to adjust the transmission power level of the Bluetooth communication module to be equal to or lower than the second maximum transmission power level.

Figure 9:
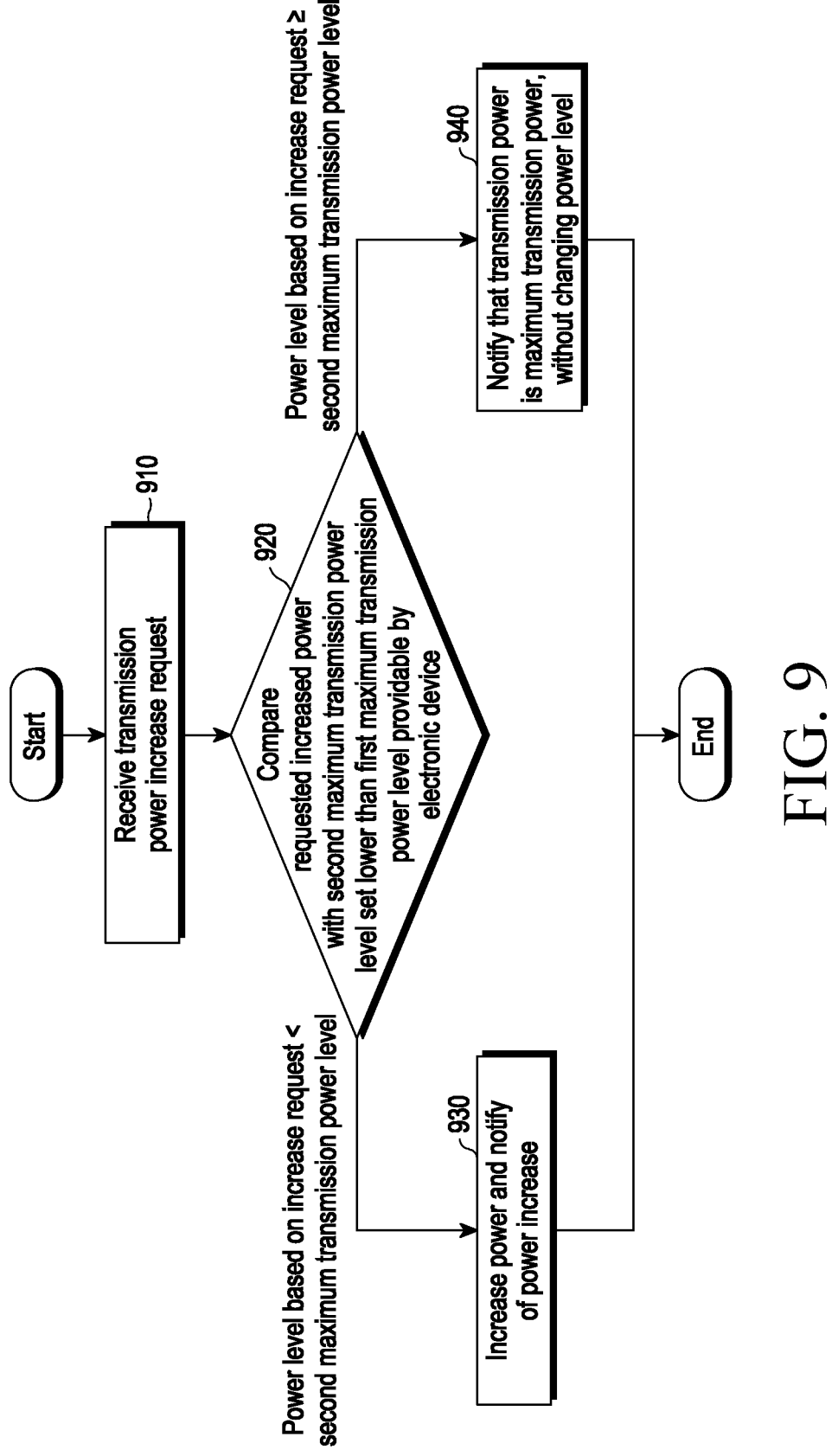
FIG. 9 is a flowchart illustrating an operation of controlling transmission power based on Bluetooth communication in an electronic device according to an embodiment of the disclosure.

FIG. 9 is a flowchart illustrating a transmission power control operation based on Bluetooth communication in an electronic device according to an embodiment of the disclosure.

Referring to FIG. 9, a Bluetooth communication module (e.g., the communication module 190 of FIG. 1, the Bluetooth communication module 590 of FIG. 5, the first Bluetooth communication module 690 of FIG. 6, the second Bluetooth communication module 790 of FIG. 7, or the third Bluetooth communication module 890 of FIG. 8) or the processor 520 of an electronic device (e.g., the electronic device 101 of FIG. 1 or the electronic device 501 of FIG. 5) according to an embodiment may perform at least one of operations 910 to 940.

In operation 910, the Bluetooth communication module 590 according to an embodiment may receive a transmission power increase request from the external electronic device 102 during a Bluetooth connection to the external electronic device 102. For example, the external electronic device 102 may request to increase a transmission power level by one step or to a maximum transmission power level by a transmission power increase request message (LMP_incr_power_req) or a maximum transmission power request message (LMP_max_power).

In operation 920, the Bluetooth communication module 590 according to an embodiment may compare the requested increased transmission power level with a second maximum transmission power level set to be lower than a first maximum transmission power level providable by the electronic device 501, based on the transmission power increase request. According to an embodiment, the first maximum transmission power level providable by the electronic device 501 may be determined based on whether the Bluetooth communication module 590 of the electronic device 501 uses a single antenna or multiple antennas, whether the Bluetooth communication module 590 uses a single antenna or multiple antennas, whether the Bluetooth communication module 590 uses a single core (processor) or multiple cores (processors), or whether the Bluetooth communication module 590 uses an iPA and/or an ePA. According to an embodiment, the second maximum transmission power level, which is a value set lower than the first maximum transmission power level, may be a maximum transmission power level in the case of using a single antenna, a single core, or an iPA or also in an example of the case of using a different combination at the Bluetooth communication module. According to an embodiment, the second maximum transmission power level may be set to be optimized during manufacturing according to the electronic device 501 or by learning of the electronic device 501.

In operation 930, when the power level based on the increase request is lower than the second maximum transmission power level, the Bluetooth communication module 590 may notify of the transmission power level increase after increasing a transmission power level. For example, the Bluetooth communication module 590 may increase a current power level by one step based on transmission power level information stored in the memory 530, and transmit a message indicating that the transmission power level has been increased to the external electronic device 102.

In operation 940, when the power level based on the increase request is equal to or higher than the second maximum transmission power level, the Bluetooth communication module 590 according to an embodiment may transmit a message indicating that a current transmission power level is a maximum transmission power level to the external electronic device 102, without increasing the transmission power level.

According to an embodiment, the Bluetooth communication module 590 may receive a transmission power decrease request from the external electronic device 102 during the Bluetooth connection to the external electronic device 102. The Bluetooth communication module 590 according to an embodiment may decrease the transmission power level based on the transmission power decrease request.

FIG. 10 is a flowchart illustrating an operation of controlling a transmission power level based on a second maximum transmission power level in an electronic device according to an embodiment of the disclosure.

Referring to FIG. 10, a processor 520 (e.g., the processor 120 of FIG. 1) or a Bluetooth communication module 590 of an electronic device (e.g., the electronic device 101 of FIG. 1 or the electronic device 501 of FIG. 5) according to an embodiment may perform at least one of operations 1010 to 1050.

In operation 1010, the processor 520 according to an embodiment may receive a transmission power increase request from the external electronic device 102 through the Bluetooth communication module 590 during a Bluetooth connection to the external electronic device 102. For example, the external electronic device 102 may request to increase a transmission power level by one step or to a maximum transmission power level by a transmission power increase request message (LMP_incr_power_req) or a maximum transmission power request message (LMP_max_power).

In operation 1020, the processor 520 may monitor parameters related to a second maximum transmission power level based on the transmission power increase request. According to an embodiment, the second maximum transmission power level may be a value set to be lower than a first maximum transmission power level. According to an embodiment, the first maximum transmission power level, which is a transmission power level actually providable by the electronic device 501, may be determined based on whether the Bluetooth communication module 590 of the electronic device 501 uses a single antenna or multiple antennas, whether the Bluetooth communication module 590 uses a single antenna or multiple antennas, whether the Bluetooth communication module 590 uses a single core (processor) or multiple cores (processors), or whether the Bluetooth communication module 590 uses an iPA and/or an ePA. For example, according to an embodiment, the second maximum transmission power level may be a maximum transmission power level in the case of using a single antenna, a single core, or an iPA at the Bluetooth communication module of the electronic device 501 or also in an example of the case of using a different combination at the Bluetooth communication module. According to an embodiment, the second maximum transmission power level may be set to be optimized during manufacturing according to the electronic device 501 or by learning (e.g., machine learning or neural network learning) of the electronic device 501. According to an embodiment, the second maximum transmission power level may be variably set based on the power performance of the Bluetooth communication module or components (e.g., an antenna, a processor, an iPA, or an ePA) of the Bluetooth communication module.

According to an embodiment, the parameters related to the second maximum transmission power level may include an RSSI, a packet retransmission rate, or/and an available channel count. The RSSI may be the received strength of a Bluetooth signal received from the external electronic device 402. The packet retransmission rate may be a retransmission rate of data received from the external electronic device 402. The available channel count may be the number of available channels among channels used for Bluetooth communication.

In operation 1030, the processor 520 according to an embodiment may identify whether the parameters related to the second maximum transmission power level satisfy a specified condition. According to an embodiment, the condition specified for the parameters related to the second maximum transmission power level may be an RSSI value equal to or greater than a reference range, a data retransmission rate less than a reference retransmission rate range, or an available channel count equal to or greater than a reference range. For example, each reference range may be determined according to a communication environment.

In operation 1040, when the parameters related to the second maximum transmission power level satisfy the specified condition, the processor 520 according to an embodiment may control the Bluetooth communication module 590 to increase the transmission power level based on the transmission power increase request received through the Bluetooth communication module 590 only up to the second maximum transmission power level.

In operation 1050, when at least some of the parameters related to the second maximum transmission power level do not satisfy the specified condition, the processor 520 according to an embodiment may control the Bluetooth communication module 590 to adjust a transmission power level to be between the second maximum transmission power level and the first maximum transmission power level, (ignoring the second maximum transmission power level).

According to an embodiment, the condition specified for the parameters related to the second maximum transmission power level may be an RSSI value equal to or greater than a reference range, a data retransmission rate less than a reference retransmission rate reference range, or an available channel count equal to or greater a reference range. For example, each reference range may be determined according to a communication environment.

According to various embodiments, a method of controlling transmission power in an electronic device (e.g., the electronic device 101 of FIG. 1 or the electronic device 501 of FIG. 5) may include receiving a transmission power increase request from an external electronic device through a Bluetooth communication module (e.g., the communication module 190 of FIG. 1, the Bluetooth communication module 590 of FIG. 5, the first Bluetooth communication module 690 of FIG. 6, the second Bluetooth communication module 790 of FIG. 7, or the third Bluetooth communication module 890 of FIG. 8) during a Bluetooth communication connection to the external electronic device, comparing a transmission power level based on the received increase request with a second maximum transmission power level set to be lower than a first maximum transmission power level providable by the electronic device, when the transmission power level based on the received increase request is lower than the second maximum transmission power level, increasing a transmission power level of the Bluetooth communication module and then control to transmit a message indicating the transmission power level increase to the external electronic device, and when the transmission power level based on the received increase request is equal to or higher than the second maximum transmission power level, transmitting a message indicating that the transmission power level of the Bluetooth communication module is a maximum transmission power level to the external electronic device, without increasing the transmission power level of the Bluetooth communication module.

According to various embodiments, the Bluetooth communication module may include a first Bluetooth communication processor (e.g., the first Bluetooth communication processor 691 of FIG. 6), a first IPA (e.g., the first iPA 693 of FIG. 6), and a first ePA (e.g., the first ePA 694 of FIG. 6).

According to various embodiments, the Bluetooth communication module may include a first Bluetooth communication processor (e.g., the first Bluetooth communication processor 791 of FIG. 7), a second Bluetooth communication processor (e.g., the second Bluetooth communication processor 797 of FIG. 7), a first iPA (e.g., the first iPA 793 of FIG. 7), and a second iPA (e.g., the second iPA 799 of FIG. 7).

According to various embodiments, the Bluetooth communication module may include a first Bluetooth communication processor (e.g., the first Bluetooth communication processor 891 of FIG. 8), a second Bluetooth communication processor (e.g., the second Bluetooth communication processor 797 of FIG. 8), a first iPA (e.g., the first iPA 893 of FIG. 8), a second iPA (e.g., the second iPA 799 of FIG. 8), a first ePA (e.g., the first ePA 894 of FIG. 8), and a second ePA (e.g., the second ePA 896 of FIG. 8).

According to various embodiments, the second maximum transmission power level may be a transmission power level based on the first Bluetooth communication processor and the first iPA.

According to various embodiments, the method may include monitoring parameters related to the second maximum transmission power level, and controlling to adjust the transmission power level of the Bluetooth communication module to be equal to or lower than the second maximum transmission power level or to adjust the transmission power level of the Bluetooth communication module to be between the first maximum transmission power level and the second maximum transmission power level, based on a result of the monitoring of the parameters related to the second maximum transmission power level.

According to various embodiments, the parameters related to the second maximum transmission power level may include at least one of an RSSI, a packet retransmission rate, or an available channel count.

According to various embodiments, when the RSSI is less than a reference range, the packet retransmission rate is greater than a reference range, and/or the available channel count is equal to or greater than a reference count range in a Bluetooth communication connection state with the external electronic device, the transmission power level of the Bluetooth communication module may be controlled to be adjusted between the first maximum transmission power level and the second maximum transmission power level.

According to various embodiments, when the RSSI is equal to or greater than the reference range, the packet retransmission rate is equal to or greater than the reference range, and/or the available channel count is equal to or less than the reference count range in the Bluetooth communication connection state with the external electronic device, the transmission power level of the Bluetooth communication module may be controlled to be adjusted to be equal to or lower than the second maximum transmission power level.

According to various embodiments, the processor 520 may store two or more reference values for each of the RSSI, the packet retransmission rate, and/or the available channel count in the memory 530.

According to an embodiment, the processor 520 may adjust the transmission power level based on the difference between an RSSI based on a signal received from the external electronic device 102 and the RSSI of the set second maximum transmission power level. For example, when the RSSI based on the signal received from the external electronic device 102 at the second maximum transmission power level is less than a preset first RSSI reference, the processor 520 may adjust the transmission power level to a transmission power level higher than the second maximum transmission power level by one step. In another example, when the RSSI based on the signal received from the external electronic device 102 at the second maximum transmission power level is less than a second RSSI reference less than the preset first RSSI reference, the processor 520 may adjust the transmission power level to a transmission power level higher than the second maximum transmission power level by two steps.

According to an embodiment, the processor 520 may adjust the transmission power level based on the difference between a packet retransmission rate based on data received from the external electronic device 102 and the packet retransmission rate of the set second maximum transmission power level. For example, when the packet retransmission rate based on the signal received from the external electronic device 102 is greater than a preset first packet retransmission rate reference, the processor 520 may adjust the transmission power level to a transmission power level higher than the second maximum transmission power level by one step. In another example, when the packet retransmission rate based on the signal received from the external electronic device 102 is greater than a second packet retransmission rate reference greater than the preset first packet retransmission rate reference, the processor 520 may adjust the transmission power level to a transmission power level higher than the second maximum transmission power level by two steps.

According to an embodiment, the processor 520 may adjust the transmission power level based on the difference between an RSSI based on a signal received from the external electronic device 102 and the RSSI of the set second maximum transmission power level and the difference between a packet retransmission rate based on data received from the external electronic device 102 and the packet retransmission rate of the set second maximum transmission power level. For example, when the RSSI based on the signal received from the external electronic device 102 at the second maximum transmission power level is less than a preset first RSSI reference, and the packet retransmission rate based on the signal received from the external electronic device 102 is greater than a preset first packet retransmission rate reference, the processor 520 may adjust the transmission power level to a transmission power level higher than the second maximum transmission power level by one step and control to use multiple antennas. In another example, when the RSSI based on the signal received from the external electronic device 102 at the second maximum transmission power level is less than a second RSSI reference less than the preset first RSSI reference, and the packet retransmission rate based on the signal received from the external electronic device 102 is greater than a second packet retransmission rate reference greater than the preset first packet retransmission rate reference, the processor 520 may adjust the transmission power level to a transmission power level higher than the second maximum transmission power level by two steps and control to use multiple antennas.

According to an embodiment, the processor 520 may adjust the transmission power level based on the difference between an available channel count identified in a communication environment with the external electronic device 102 and the available channel count of the set second maximum transmission power level. For example, when the available channel count identified in the communication environment with the external electronic device 102 is or is close to a specified count (e.g., 20), the processor 520 may adjust the transmission power level to a transmission power level higher than the second maximum transmission power level by one or two steps and control to use multiple antennas.

According to an embodiment, when the RSSI based on the signal received from the external electronic device 102 at the second maximum transmission power level is greater than a preset third RSSI reference, the processor 520 may adjust the transmission power level to a transmission power level lower than the second maximum transmission power level by one step. For example, when the RSSI based on the signal received from the external electronic device 102 at the second maximum transmission power level is greater than a preset fourth RSSI reference greater than preset third RSSI reference, the processor 520 may adjust the transmission power level to a transmission power level lower than the second maximum transmission power level by two steps. For example, when the packet retransmission rate based on the signal received from the external electronic device 102 is less than a preset third packet retransmission rate reference, the processor 520 may adjust the transmission power level to a transmission power level lower than the second maximum transmission power level by one step. For example, when the packet retransmission rate based on the signal received from the external electronic device 102 is greater than a fourth third packet retransmission rate reference greater than preset third packet retransmission rate reference, the processor 520 may adjust the transmission power level to a transmission power level lower than the second maximum transmission power level by two steps. For example, when the RSSI based on the signal received from the external electronic device 102 at the second maximum transmission power level is greater than the preset third RSSI reference, and the packet retransmission rate based on the signal received from the external electronic device 102 is less than the preset third packet retransmission rate reference, the processor 520 may adjust the transmission power level to a transmission power level lower than the second maximum transmission power level by one step, and control to use a single antenna. For example, when the RSSI based on the signal received from the external electronic device 102 at the second maximum transmission power level is greater than the preset fourth RSSI reference greater than the preset third RSSI reference, and the packet retransmission rate based on the signal received from the external electronic device 102 is less than the preset fourth packet retransmission rate reference less than the preset third packet retransmission rate reference, the processor 520 may adjust the transmission power level to a transmission power level lower than the second maximum transmission power level by two steps, and control to use a single antenna. For example, when the available channel count identified in the communication environment with the external electronic device 102 is equal to or greater than a specified count (e.g., 24), the processor 520 may adjust the transmission power level to a transmission power level lower than the second maximum transmission power level by one or two steps and control to use a single antenna.

According to an embodiment, parameter values for adjusting the transmission power level may further include TxDiv_Threshold, epa_bf_threshol, Always_epa_bf_threshold, A2DP Link Feedback (ALF), SIC_RSSI_Threshold, Standard Power Control, HPTX_RSSI_Threshold, and MRC_RSSI_Threshold.

For example. TxDiv_Threshold may be an RSSI difference threshold (e.g., 15 dB) for an RSSI difference between signals received through two antennas, when a Bluetooth signal is received through the two antennas, and when the RSSI difference between the signals is greater than the RSSI difference threshold, the processor 520 may decrease the transmission power level to a transmission power level from the use of a single antenna.

For example, epa_bf_threshol may be a first threshold (e.g., −75 dB) for a signal strength received from the external electronic device 102, and when the signal strength received from the external electronic device 102 is less than the first threshold, the processor 520 may increase the transmission power level to a transmission power level from the use of the first iPA+the first ePA+the second iPA+the second ePA, during retransmission.

For example, Always_epa_bf_threshold may be a second threshold (e.g., −85 dB) for the signal strength received from the external electronic device 102, and when the signal strength received from the external electronic device 102 is less than the second threshold, the processor 520 may increase the transmission power level to a transmission power level from the use of the first iPA+the first ePA+the second iPA+the second ePA during all data transmissions as well as retransmission.

For example, SIG_RSSI_Threshold may be a third threshold (e.g., −65 dB) for determining whether to increase the transmission power level to the second maximum transmission power level or higher. For example, when the signal strength received from the external electronic device 102 is less than the third threshold, the processor 520 may increase the transmission power level from the second maximum transmission power level (e.g., a default level (e.g., using the first iPA)).

For example, Standard Power control may be a transmission power level range used at or above the third threshold, that is, at or below the second maximum transmission power level.

For example, HPTX_RSSI_Threshold may be a threshold used to identify whether a signal strength received from the external electronic device 102 in a situation (e.g., non-A2DP or non-eSCO connection) other than audio signal transmission (e.g., voice or music-related signal transmission) is equal to or less than a specified first strength (−75 dB). When the signal strength received from the external electronic device 102 in the situation other than audio signal transmission is equal to or less than the specified first strength (−75 dB), the processor 520 may increase the transmission power level higher than the second maximum transmission power level.

For example, MRC_RSSI_Threshold may be a threshold used to identify whether a signal strength received from the external electronic device 102 in a situation (e.g., non-A2DP or non-eSCO connection) other than audio signal transmission (e.g., voice or music-related signal transmission) is equal to or less than a specified second strength (−65 dB). When the signal strength received from the external electronic device 102 in the situation other than audio signal transmission is equal to or less than the specified second strength (−65 dB), the processor 520 may increase the transmission power level higher than the second maximum transmission power level.

Besides, the transmission power level may be maintained to be the second maximum transmission power level or increased above the second maximum transmission power level according to various conditions.

According to an embodiment, when increasing the transmission power level above the second maximum transmission power level, the processor 520 may adjust the transmission power level to be between the second maximum transmission power level and the first maximum transmission power level, and the transmission power level may be set equal to the first maximum transmission power level. For example, when an RSSI received from the external electronic device 102 at the second maximum transmission power level is less than or equal to a specified threshold, a packet retransmission rate is equal to or greater than a specified threshold, and/or an available channel count is less than or equal to a specified threshold, the processor 520 may set the transmission power level equal to the first maximum transmission power level.

According to an embodiment, when performing communication with each of a plurality of external electronic devices, the processor 520 may set and use a first maximum transmission power level and a second maximum transmission power level for each external electronic device. For example, when performing communication with an external electronic device (not shown) other than the external electronic device 102, the processor 520 may set and use a first maximum transmission power level and a second maximum transmission power level corresponding to the external electronic device 102 for the other external electronic device (not shown). For example, the second maximum transmission power level corresponding to the external electronic device 102 may be different from the second maximum transmission power level corresponding to the other external electronic device (not shown).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it denotes that the element may be coupled with the other element directly (e.g., wiredly), wirelessly, or via a third element.

As used in the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term 'non-transitory' simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, a non-volatile storage medium may store instructions configured to, when executed by at least one processor, cause the at least one processor to perform at least one operation. The at least one operation may include receiving a transmission power increase request from an external electronic device through a Bluetooth communication module during a Bluetooth communication connection to the external electronic device, comparing a transmission power level based on the received increase request with a second maximum transmission power level set to be lower than a first maximum transmission power level providable by the electronic device, when the transmission power level based on the received increase request is lower than the second maximum transmission power level, increasing a transmission power level of the Bluetooth communication module and then transmitting a message indicating the transmission power level increase to the external electronic device, and when the transmission power level based on the received increase request is equal to or higher than the second maximum transmission power level, controlling to transmit a message indicating that the transmission power level of the Bluetooth communication module is a maximum transmission power level to the external electronic device, without increasing the transmission power level.

Embodiments of the disclosure invented in the specification and the drawings are merely provided for specific examples to easily explain the technical idea according to the embodiments of the disclosure and help the understanding of the embodiments of the disclosure, not intended to limit the scope of the embodiments of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
Bluetooth communication circuitry;
memory, comprising one or more storage media, storing instructions; and
one or more processors communicatively coupled to the Bluetooth communication circuitry and the memory, wherein the instructions, when executed by the one or more processors individually or collectively, cause the electronic device to:
   receive a transmission power increase request from an external electronic device through the Bluetooth communication circuitry during a Bluetooth communication connection to the external electronic device,
   monitor parameters related to a second maximum transmission power level based on the receiving of the transmission power increase request, wherein the second maximum transmission power level is specified to be lower than a first maximum transmission power level specified to be available by the electronic device,
   based on the parameters related to the second maximum transmission power level satisfying a specified condition, increase a transmission power of the Bluetooth communication circuitry within a range not exceeding the second maximum transmission power level, and
   based on the parameters related to the second maximum transmission power level not satisfying the specified condition, increase the transmission power of the Bluetooth communication circuitry up to the first maximum transmission power level, and
   wherein the parameters related to the second maximum transmission power level include at least one of a received signal strength indicator (RSSI), a packet retransmission rate, or an available channel count.

2. The electronic device of claim 1, wherein the Bluetooth communication circuitry comprises:
   a first Bluetooth communication processor;
   a first internal power amplifier (iPA); and
   a first external power amplifier (ePA).

3. The electronic device of claim 2, wherein the second maximum transmission power level is a transmission power level based on the first Bluetooth communication processor and the first iPA.

4. The electronic device of claim 1, wherein the Bluetooth communication circuitry comprises:
   a first Bluetooth communication processor;
   a second Bluetooth communication processor;
   a first internal power amplifier (iPA); and
   a second iPA.

5. The electronic device of claim 1, wherein the Bluetooth communication circuitry comprises:
   a first Bluetooth communication processor;
   a second Bluetooth communication processor;
   a first internal power amplifier (iPA);
   a second iPA;
   a first external power amplifier (ePA); and
   a second ePA.

6. The electronic device of claim 1 wherein the instructions, when executed by the one or more processors individually or collectively, further cause the electronic device to:
   adjust a transmission power level of the Bluetooth communication circuitry to be equal to or lower than the second maximum transmission power level or adjust the transmission power level of the Bluetooth communication circuitry to be between the first maximum transmission power level and the second maximum transmission power level, based on a result of the monitoring of the parameters related to the second maximum transmission power level.

7. The electronic device of claim 6, wherein the instructions, when executed by the one or more processors individually or collectively, further cause the electronic device to:
   in response to the RSSI being less than a reference range, the packet retransmission rate being greater than a reference range, or the available channel count being equal to or greater than a reference count range in a Bluetooth communication connection state with the external electronic device, adjust the transmission power level of the Bluetooth communication circuitry to be between the first maximum transmission power level and the second maximum transmission power level.

8. The electronic device of claim 7, wherein the instructions, when executed by the one or more processors individually or collectively, further cause the electronic device to:
   in response to the RSSI being equal to or greater than the reference range, the packet retransmission rate being equal to or greater than the reference range, or the available channel count being equal to or less than the reference count range in the Bluetooth communication connection state with the external electronic device, adjust the transmission power level of the Bluetooth communication circuitry to be equal to or lower than the second maximum transmission power level.

9. A method of controlling transmission power in an electronic device, the method comprising:
   receiving a transmission power increase request from an external electronic device through Bluetooth communication circuitry during a Bluetooth communication connection to the external electronic device;
   monitoring parameters related to a second maximum transmission power level based on the receiving of the transmission power increase request, wherein the second maximum transmission power level specified to be lower than a first maximum transmission power level is specified to be available by the electronic device; and
   based on the parameters related to the second maximum transmission power level satisfying a specified condition, increasing a transmission power of the Bluetooth communication circuitry within a range not exceeding the second maximum transmission power level or based on the parameters related to the second maximum transmission power level not satisfying the specified condition, increasing the transmission power of the Bluetooth communication circuitry up to the first maximum transmission power level,
   wherein the parameters related to the second maximum transmission power level include at least one of a received signal strength indicator (RSSI), a packet retransmission rate, or an available channel count.

10. The method of claim 9, wherein the Bluetooth communication circuitry comprises:

a first Bluetooth communication processor, a first internal power amplifier (iPA), and a first external power amplifier (ePA).

11. The method of claim 10, wherein the second maximum transmission power level is a transmission power level based on the first Bluetooth communication processor and the first iPA.

12. The method of claim 9, wherein the Bluetooth communication circuitry comprises:

a first Bluetooth communication processor, a second Bluetooth communication processor, a first internal power amplifier (iPA), and a second iPA.

13. The method of claim 9, wherein the Bluetooth communication circuitry comprises:

a first Bluetooth communication processor, a second Bluetooth communication processor, a first internal power amplifier (iPA), a second iPA, a first external power amplifier (ePA), and a second ePA.

14. The method of claim 9, further comprising:

controlling to adjust a transmission power level of the Bluetooth communication circuitry to be equal to or lower than the second maximum transmission power level or to adjust the transmission power level of the Bluetooth communication circuitry to be between the first maximum transmission power level and the second maximum transmission power level, based on a result of the monitoring of the parameters related to the second maximum transmission power level.

15. The method of claim 14, further comprising:

in response to the RSSI being less than a reference range, the packet retransmission rate being greater than a reference range, or the available channel count being equal to or greater than a reference count range in a Bluetooth communication connection state with the external electronic device, adjusting the transmission power level of the Bluetooth communication circuitry to be between the first maximum transmission power level and the second maximum transmission power level.

16. The method of claim 15, further comprising:

in response to the RSSI being equal to or greater than the reference range, the packet retransmission rate being equal to or greater than the reference range, or the available channel count being equal to or less than the reference count range in the Bluetooth communication connection state with the external electronic device, adjusting the transmission power level of the Bluetooth communication circuitry to be equal to or lower than the second maximum transmission power level.

17. A non-volatile storage medium storing instructions configured to, when executed by at least one processor of an electronic device, cause the at least one processor to perform at least one operation, wherein the at least one operation includes:

receiving a transmission power increase request from an external electronic device through Bluetooth communication circuitry during a Bluetooth communication connection to the external electronic device;

monitoring parameters related to a second maximum transmission power level based on the receiving of the transmission power increase request, wherein the second maximum transmission power level specified to be lower than a first maximum transmission power level is specified to be available by the electronic device; and based on the parameters related to the second maximum transmission power level satisfying a specified condition, increasing a transmission power of the Bluetooth communication circuitry within a range not exceeding the second maximum transmission power level or based on the parameters related to the second maximum transmission power level not satisfying the specified condition, increasing the transmission power of the Bluetooth communication circuitry up to the first maximum transmission power level, wherein the parameters related to the second maximum transmission power level include at least one of a received signal strength indicator (RSSI), a packet retransmission rate, or an available channel count.

* * * * *